(No Model.)
T. SAULT.
PHOTOGRAPHIC FILM HOLDER.
No. 477,337. Patented June 21, 1892.
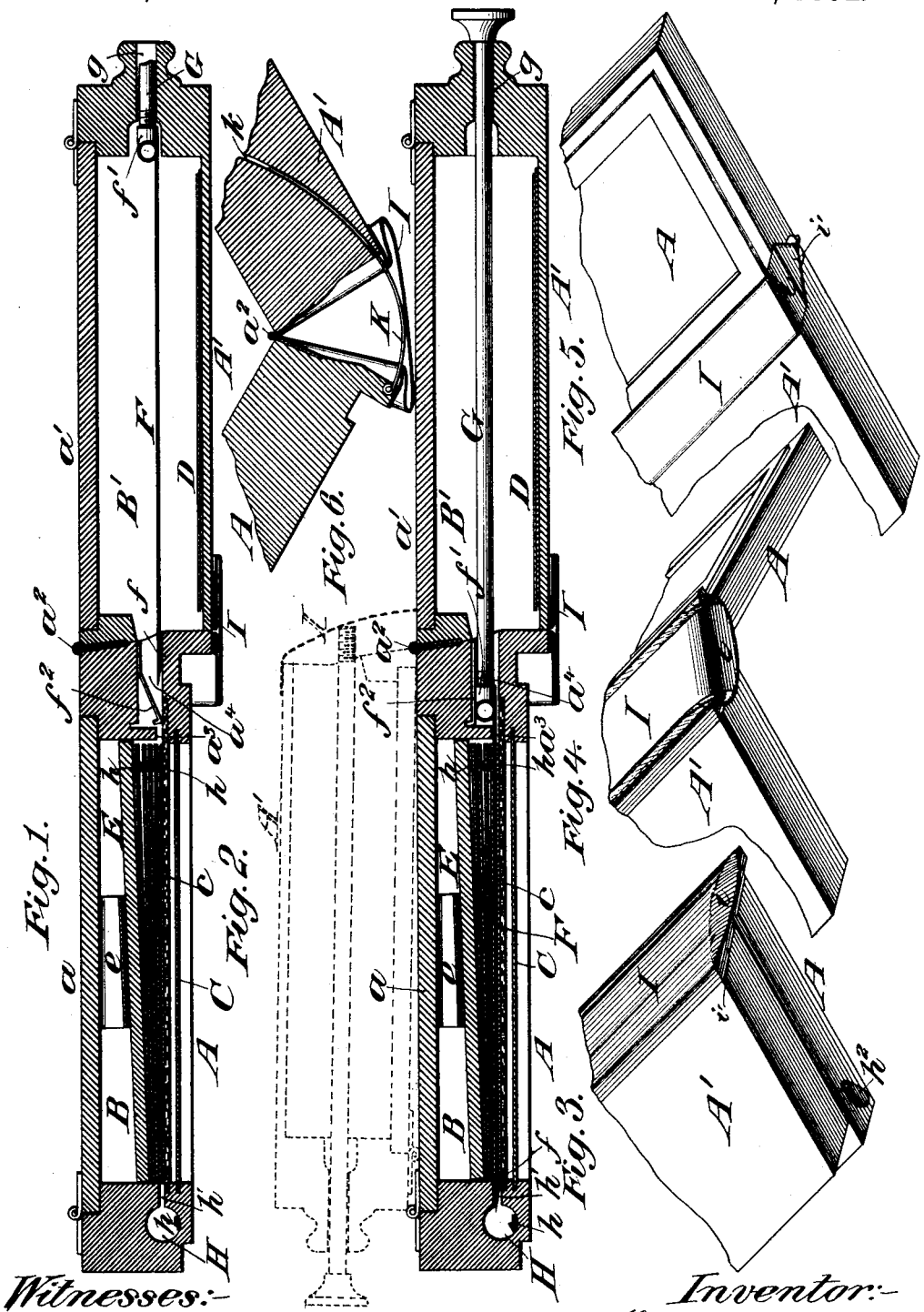
Witnesses:
D. N. Hayward
C. L. Sundgren
Inventor:
Thomas Sault
by attorneys
Brown & Seward

UNITED STATES PATENT OFFICE.

THOMAS SAULT, OF NEW HAVEN, CONNECTICUT.

PHOTOGRAPHIC FILM-HOLDER.

SPECIFICATION forming part of Letters Patent No. 477,337, dated June 21, 1892.

Application filed October 29, 1891. Serial No. 410,194. (No model.)

*To all whom it may concern:*

Be it known that I, THOMAS SAULT, of New Haven, in the county of New Haven and State of Connecticut, have invented a new and useful Improvement in Film-Holders for Photographic Cameras, of which the following is a specification.

My invention relates to an improvement in film-holders for photographic cameras in which dark-chambers—one for the reception of a plurality of films before exposure and the other for the reception of the films after exposure—are so hinged together and provided with means for shifting the films from one chamber to the other and for shutting out the light that the holder may be folded and compactly stored within the camera-box for transportation, unfolded, and the plurality of plates successively exposed, transferred from the exposing-chamber to the storage-chamber, and the parts subsequently refolded without liability of the slightest damage by the unintentional admission of light.

A practical embodiment of my invention is represented in the accompanying drawings, in which—

Figure 1 represents a transverse section through the two hinged sections, showing them unfolded as in use for making exposures, the combined film-transferring slide and shield being represented withdrawn from the exposing-chamber and in the position which it assumes after having transferred a film from the exposing-chamber to the storage-chamber. Fig. 2 is a similar view showing in dotted lines the folded position of the storage-chamber and representing the combined film-transferring slide and shield within the exposing-chamber between the film which has been or is about to be exposed and the next succeeding film and in the position which it assumes when about to transfer the exposed film from the exposing-chamber to the storage-chamber. Figs. 3, 4, and 5 represent in perspective views of the end and a portion of the body of the dark-hinge, showing, respectively, the positions which it assumes when the folding sections of the holder are closed, partially open, and full open; and Fig. 6 is a transverse section through the hinge and portions of the folding sections of the holder, showing means for keeping the back of the dark-hinge from collapsing.

The folding sections of the holder containing the exposure and storage chambers are represented, respectively, by A and A', the hinged doors for gaining access to their interiors by $a$ and $a'$, and the chambers themselves by B and B'. The sections A and A' are of oblong rectangular shape, as is common, and the section A is provided with a slide C at its front for the purpose of making exposures, and with a glass plate $c$, through which the exposure of the films is made, and against the rear of which the film to receive the exposure is intended to be flatly held.

The films are represented by D, and in the present instance I have shown seven of them, five in the exposing-chamber and two in the storage-chamber. The number, however, may be increased or diminished at pleasure, the number which I find it convenient to store for successive exposure being from twelve to twenty.

A follower E is adapted to rest upon the rearmost film within the chamber B and under the pressure of the spring $e$, engaged with a door $a$ at the back of the chamber, serves to press the films flatly against the glass plate $c$ as they are successively allowed to come in contact with it. The two sections A and A' are hinged together at the inner edges of two adjacent sides, as shown at $a^2$.

The combined transferring slide and shield F, consisting of a thin plate of metal or other suitable opaque material, is of such size and shape as to form a complete shield between two successive films, shutting out any light which may pierce through the film in front of it from access to the film which is at the rear of it. The said slide and shield F is provided on its front face a short distance from its inner edge with a shoulder $f$, adapted to hook over the edge of one of the films D for the purpose of removing it from the chamber B into the chamber B'. The said slide and shield F is allowed a sliding motion from its position within the chamber B', as shown in Fig. 1, through the slot $a^3$ in the adjacent end or ends of the folding sections into its position within the chamber B, as shown in Fig. 2. The said slide is operated by means of a rod G, which extends within an opening $g$ in the upper edge of the section A' and has a screw-threaded engagement with a socket $f'$, fixed to the outer edge of the slide F. For the purpose of inserting the socket portion $f'$ of the slide wholly within the edge of one of the sections—as, for example, A—for purposes of folding the sections I provide an enlarged opening $a^4$, leading to the slot $a^3$, and for the purpose of directing the inner edge of the slide F from the larger opening $a^4$, within the narrow slot $a^3$, I provide a spring-arm $f^2$, the free end of which is permitted to lift and allow the slide and also the socket to pass it.

For the purpose of insuring the insertion of the inner edge of shield $f$ between the film at the front and the next succeeding film I find it desirable to employ devices for spacing the edges of the film apart. In the present instance I provide a series of thin spacing-strips $h$, which may be laid between each successive two of the films near their inner edges, as shown in Figs. 1 and 2, and which as the slide F advances between the films may be slid by its advancing edge across the chamber B and through the slot $h'$ at its outer edge into the strip-receiving chamber H, from which they may be removed at pleasure by opening cap $h^2$ at the end.

In order to prevent any admission of light within the chambers during the opening and closing of the folding sections A A', it is essential that they should be connected by a dark hinge or hood completely inclosing the gradually diminishing or increasing space between the adjacent hinged sides of the sections. To accomplish this end and at the same time avoid a clumsy arrangement, I provide a hinge or hood of the following construction: A strip or band I, of leather or other suitable flexible material, connects the outer or back edges of the hinged sides of the two folding sections and is sufficiently wide to extend from edge to edge when the sections are closed, as shown in Fig. 3. The said strip I is also made to project beyond the ends of the hinged sides or edges, as shown at $i$, and has its corners slightly rounded. Similar pieces of leather or other suitable flexible material $i'$ are shaped to correspond to the projecting ends $i$ of the strip I and are secured one at each end to the strip I and to the folded sections, one edge of the piece $i$ being secured along the end edges of the folding sections from the hinge $a^2$ to the back and the other edge of said piece $i$ being secured to the edge of the extended piece $i$. When the folding sections A A' are opened, the body portion of the strip I will be at first thrown outwardly away from the edges of the folding sections, and as the opening advances toward a full opening the edges of the strip I, which are fast to the corners of the sections, will be carried underneath the central portion of the strip, as represented in Fig. 4, and will finally draw the central portion of the strip at the back and ends down into a flat position, as represented in Fig. 5.

In order to prevent any accidental tendency of the strip I to collapse during the opening of the sections or before the corners of the sections have fairly advanced underneath the central portion of the strip, I provide at each end a distending device K, consisting in the present instance of a spring-wire pivotally secured at the corner of one of the sections within the dark hinge or hood, its free end being adapted to slide within a curved opening $k$, formed in the edge of the opposite folding section, as clearly shown in Fig. 6.

The operation may be briefly described as follows: The films D having been packed within the exposing-chamber and the edge-separating devices placed in position, the follower E inserted, and the door $a$ closed, the slide F being located in the position shown in Fig. 2, between the outer film and the one next adjacent to it, and the operating-rod G detached from the slide, the sections may be folded, as represented in full and dotted lines, Fig. 2, and packed for transportation. When it is desired to make one or several successive exposures, the sections may be unfolded and the operating-rod G engaged with the socket $f'$ by simply turning it. If now the slide C be withdrawn, the exposure of the first film D will be made, but no light will be allowed to gain access to the next succeeding film, because of the location of the shield F between the first and second film. The slide C, being again returned to position, the film which has been exposed may be slid into the storage-chamber B' by drawing outwardly the operating-rod G, the shoulder $f$ on the shield hooking over the edge of said film and sliding it, together with the shield F, into the chamber B', where it will be allowed to fall into the bottom of the chamber out of the way of the slide. The slide may then be returned to its position in the chamber B, between the front film and the one next behind it, and the exposure of the second film may then be made by withdrawing the slide C. The return of the slide F from the chamber B' into the chamber B will push before it the spacing-strip $h$, depositing the same within the strip-receiving chamber H. In this manner the successive films may be exposed one after another without access to the interior of the chambers B and B' other than by means of the operating-rod G, and the films so exposed may be finally carried within the folded sections to the dark-room and the pictures developed at pleasure.

What I claim is—

1. The film-holder comprising folding sections hinged together independently of the camera-box, one section containing an exposing-chamber and the other a storage-chamber, means for excluding light from entering the chambers at the hinged sides, a transparent plate at the front of the exposing-chamber, a follower for holding the films flatly against the transparent plate, and means for successively engaging the rear edges of each film and forcing the film forward from one chamber to the other, substantially as set forth.

2. The film-holder comprising an exposing-chamber and a storage-chamber arranged to intercommunicate, means for holding a plurality of films in position to be successively exposed, a shield having a sliding movement from one chamber to the other, and means for directing the shield between the film in position to be exposed and the next succeeding film, thereby excluding light from the second film during the exposure of the first film, substantially as set forth.

3. The film-holder comprising folding sections, one containing an exposing-chamber and the other a storage-chamber, means for holding a plurality of films in the exposing-chamber in position to be successively exposed, and a combined film-transferring slide and shield adapted to traverse the two chambers, substantially as set forth.

4. The film-holder comprising folding sections, one containing an exposing-chamber and the other a storage-chamber, means for holding a plurality of films in the exposing-chamber in position to be successively exposed, a combined film-transferring slide and shield adapted to traverse the two chambers, and an operating-rod having a removable engagement with the slide and shield, substantially as set forth.

5. The film-holder comprising the folding sections, one containing an exposing-chamber and the other a storage-chamber, spacing devices for separating the films at their edges, a chamber for receiving the spacing devices, and a combined film-transferring slide and shield adapted to traverse the chambers and remove the spacing device into the receiving-chamber as the slide and shield assumes its position between the films, substantially as set forth.

6. The combination, with folding sections, of a dark hinge or hood covering the space between the opening and closing edges of the sections at the side and ends and connected to the opposite sections, the opposite sides of the hood being adapted to fold beneath the central portion as the sections open, substantially as set forth.

7. The dark hinge or hood comprising the strip adapted to extend from one outside edge of two folding sections to the opposite outside edge of the two hinged sides of the sections and to project beyond the ends of the two meeting sides, and end pieces, one edge of each being secured to the projecting end of the strip and the opposite edge of each adapted to be secured to the swinging end edges of the hinged sides of the section, substantially as set forth.

8. The combination, with the two folding sections and the dark hinge or hood secured to their opening edges at their hinged sides and covering the space between them, of distending devices secured to the sections within the hinge or hood to prevent the collapse of the hood, substantially as set forth.

THOMAS SAULT.

Witnesses:
LUCIUS B. HINMAN,
FRANK. M. LOVEJOY.